UNITED STATES PATENT OFFICE.

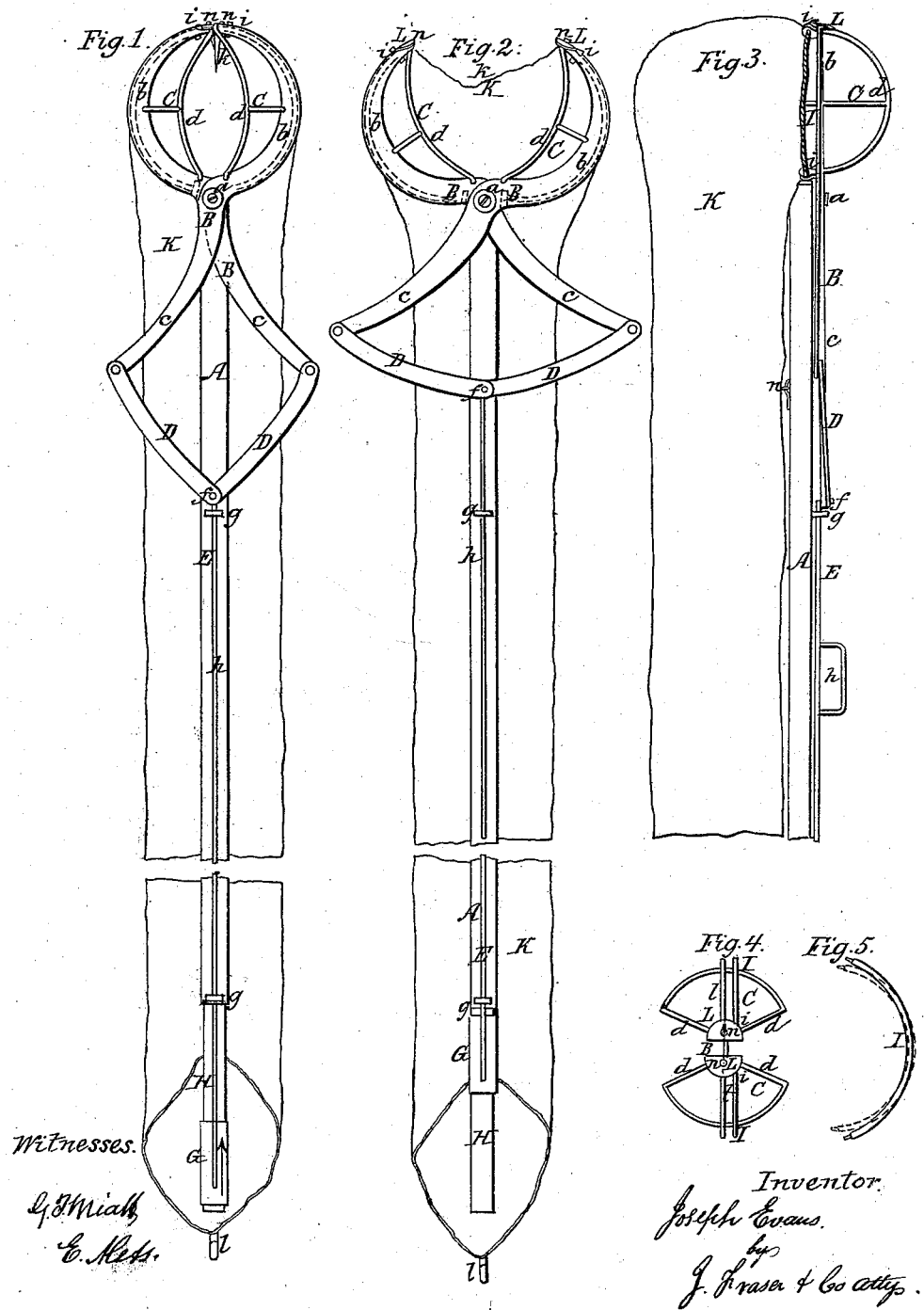

JOSEPH EVANS, OF NEWARK, NEW JERSEY.

IMPROVEMENT IN FRUIT-GATHERERS.

Specification forming part of Letters Patent No. 36,834, dated November 4, 1862.

*To all whom it may concern:*

Be it known that I, JOSEPH EVANS, of Newark, in the county of Essex and State of New Jersey, have invented a new and useful Improvement in Instruments for Gathering Fruit and for Pruning Trees; and I do hereby declare that the following is a full and exact description thereof, reference being had to the accompanying drawings, making part of this specification.

Figure 1 being a front elevation of my improved instrument with the jaws closed in the act of removing fruit from a tree; Fig. 2, a similar view thereof with the jaws open in the position for admitting the fruit between them; Fig. 3, a side elevation of the upper portion of the same; Fig. 4, a plan of the jaws opened a small distance, and showing more particularly the arrangement of the knives for cutting the stems of the fruit and for pruning; Fig. 5, a view of the detachable spring wire or rod for securing the conveyer to the jaws.

Like letters designate corresponding parts in all the figures.

My improved instrument is intended for the double purpose of gathering fruit from trees and from pruning them of twigs and light branches.

An ordinary pole or shaft, A, is provided, of suitable length, to the upper end of which is jointed, at $a$, one over the other, two similar levers, B B, the upper jaw ends, $b\ b$, thereof being curved from each other in circular form of sufficient size to contain the largest-sized apple or other fruit when closed together, and the lower ends, $c\ c$, crossing each other and extending divergingly downward and outward a suitable distance, and with the ends of which the actuating parts are connected, as will be presently described.

To the upper or short ends, $b\ b$, of the levers are respectively secured skeleton concaves formed of wires and of suitable size, and constituting, together with the ends of the levers, respectively, concave semi-globular-shaped jaws C C, thus conforming with the shape of the fruit which they grasp. The front and rear vertical wires, $d\ d$, attached to their respective levers, are set at an angle to or outward from the central vertical plane at right angles to the motion of the jaws in the direction from each other, as clearly represented, for a purpose which will be presently described.

To the top of the jaws are respectively secured two knives, L L, by means of set-screws $n\ n$, passing down through them in such a manner that they are readily removable. These knives are of suitable size for the purpose designed, and are made to overlap one another closely when closed, as represented.

To the extremities of the lower or long ends, $c\ c$, of the levers are pivoted connecting-bars D D, extending downward convergingly and jointed together at $f$ to a stiff sliding rod, E, passing thence down through suitable bearing, $g\ g$, to the foot of the pole or shaft, where it is fastened to a guide collar or thimble, G, resting and sliding on a cylindrical portion, H, of the pole of suitable length to give the necessary vertical play to the collar. The rod E, and consequently the jaws C C, is actuated by sliding the collar up and down on the end of the pole. The rod E is provided with one or more handles, $h\ h$, at suitable positions thereon, so that in using the instrument at but small heights it may be easily operated otherwise than from the lower end thereof.

On the rear side of the upper and lower extremities of the short ends $b\ b$ of the jaw-levers are secured respectively laterally-projecting eyes $i\ i$, of suitable size and substantially of the shape represented in Fig. 3, having holes or sockets, in which fit the ends of a curved spring wire or rod, I, Figs. 3 and 5, which conforms in shape, when in place, with the said jaw ends of the levers. The ends of the spring wire that form the bearings are made a little smaller than the body of the same, so as to be securely retained in the eyes, and the wire has sufficient spring to always hold it in place. When the wires are to be removed from the instrument (for the purposes hereinafter described) they are compressed, as indicated by the red outline in Fig. 5, so as to easily slide from place. To these wires are respectively secured by sewing or otherwise, the opposite sides of the mouth of a tubular conveyer, K, having a slit or opening, $k$, of sufficient length to allow the free expansion of the jaws, and usually made of cloth and of a size to allow the passage of the largest-sized fruit, and extending to the bottom of the pole, having a hook, *l*, on its lower end for attaching to a basket or other receptacle for the fruit. The conveyer is attached to the pole at suitable points, as represented at *m*, Fig. 3, to sustain it properly. Thus arranged, the conveyer is applied easily, and is detached at any time by merely compressing the two opposite spring wires secured to the opposite jaws.

The cross-levers B B, both having an equal and similar motion, open the jaws alike and to an equal extent to receive the fruit or to cut off twigs, and by being connected with the bars D D and sliding rod E the action is equable and the greatest power is produced. The advantage of this arrangement over that having but one lever operated by a cord is apparent, for in the latter case not only is the power applied in an inconvenient manner and the effect reduced, but the action of drawing a cord is irregular and not easily accomplished, and it is difficult to hold and govern the pole while one hand is used in operating the device.

In operating the rod E both hands of the operator are retained and grasp the pole during the whole action, thus easily sustaining and guiding it, while at the same time a strong power is exerted on the levers by a small outlay of force, the parts forming, as it were, a stiff connection of the whole device. The conveyer K by being removable from the pole is detached at pleasure and without trouble, and this is sometimes necessary in gathering fruit in difficult places, where the conveyer is an impediment, and also in picking very choice or soft fruits, that would be injured in passing down through the tube. It is necessary also to remove the conveyer in pruning trees. The device for attaching and detaching it is of cheap construction, not liable to disarrangement, and secures the object for which it is intended in a very simple manner.

The position of the knives L L at the top of the jaws is such as to cut the stems of the fruit without injury to the fruit itself, and their adjustability enables them to be adapted to any kind of work, or to be removed from the jaws for sharpening. In pruning trees the vertical wires *d d* are essential to properly guide the twigs to the knives. The twigs passing into the wide space between them slide readily up to the edges of the knives, where they meet, and thus always present them to the cutting-edges without difficulty. Were it not for these wires it would be difficult to guide the twigs between the knives. The jaws by being of skeleton form afford an unobstructed vision through, which is necessary, especially in pruning twigs.

I am aware that jaws of concave or globular shape have before been used in fruit-gatherers; but such I do not claim. Neither do I claim separately any of the parts herein described.

What I claim as my invention, and desire to secure by Letters Patent, is—

1. Attaching and detaching the conveyer K to and from the jaw-levers by means of the curved spring wires or rods I I and lateral eyes *i i*, the whole arranged, combined, and operating substantially as and for the purpose herein set forth.

2. The particular arrangement of the whole instrument, consisting essentially of the cross-levers B B, connecting-bars D D, sliding rod E, guide-collar G, pole A, with the cylindrical end H and detachable conveyer K, substantially as herein described.

3. The vertical separated wires *d d* of the jaws for properly guiding the twigs to the knives in pruning, in combination with the knives L L at the top of the jaws, arranged and operating substantially as herein described.

In witness whereof I have hereunto signed my name in the presence of two subscribing witnesses.

JOSEPH EVANS.

Witnesses:
 THOS. EVANS,
 R. F. OSGOOD.